(12) United States Patent
Soliman (10) Patent No.: US 6,201,954 B1
(45) Date of Patent: Mar. 13, 2001

(54) METHOD AND SYSTEM FOR PROVIDING AN ESTIMATE OF THE SIGNAL STRENGTH OF A RECEIVED SIGNAL

(75) Inventor: Samir S. Soliman, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/048,454

(22) Filed: Mar. 25, 1998

(51) Int. Cl.$^7$ .................................................. H04B 17/00
(52) U.S. Cl. ...................... 455/226.2; 455/525; 455/442; 370/332
(58) Field of Search .............................. 455/226.1, 226.2, 455/226.3, 226.4, 227, 524, 525, 442; 370/332

(56) References Cited

U.S. PATENT DOCUMENTS

| | | | |
|---|---|---|---|
| 4,901,307 | 2/1990 | Gilhousen et al. | 455/562 |
| 5,101,501 | * 3/1992 | Gilhousen et al. | 455/442 |
| 5,103,459 | * 4/1992 | Gilhousen et al. | 455/422 |
| 5,267,261 | * 11/1993 | Blakeney et al. | 455/437 |
| 5,457,818 | * 10/1995 | Butler | 455/227 |
| 5,758,271 | * 5/1998 | Rich et al. | 455/226.2 |
| 5,946,607 | * 8/1999 | Shiino et al. | 455/234.1 |
| 6,034,952 | * 3/2000 | Dohi et al. | 455/69 |

FOREIGN PATENT DOCUMENTS

| | | | |
|---|---|---|---|
| 0756387 | 1/1997 | (EP) | H04B/1/707 |
| 9739545 | 10/1997 | (WO) | H04J/13/00 |
| WO 97/39545 | * 10/1997 | (WO) | H04J/13/00 |

* cited by examiner

*Primary Examiner*—Fan Tsang
*Assistant Examiner*—Rafael Perez-Gutierrez
(74) *Attorney, Agent, or Firm*—Philip Wadsworth; Bruce W. Greenhaus; Thomas R. Rouse (57) ABSTRACT

The signal strength of a received signal in a communication system is estimated by the measured signal strength of a desired signal which is transmitted from a source device to a destination device. The energy of the desired signal and the energy of the noise are measured or computed. The measured signal strength can be computed by dividing the energy of the desired signal with the energy of the noise. The signal strength of the desired signal can be estimated as the maximum likelihood estimate of the actual signal strength $\alpha$. The signal strength of the desired signal can also be estimated based on the expected value of the energy of the desired signal. The signal strength of the desired signal can further be estimated based on the expected value of the energy of the desired signal and accounting for a predetermined bias.

11 Claims, 8 Drawing Sheets

METHOD AND SYSTEM FOR PROVIDING AN ESTIMATE OF THE SIGNAL STRENGTH OF A RECEIVED SIGNAL

BACKGROUND OF THE INVENTION

I. Field of the Invention

The present invention relates to communications. More particularly, the present invention relates to a method and apparatus for providing an estimate of the signal strength of a received signal in a communication system.

II. Discussion of the Background

In many communication systems, the efficient use of system resource depends on the ability to accurately estimate the quality of the communication channel or link. The channel quality is related to the signal strength of a received signal which has been transmitted through the communication channel. Typically, the received signal comprises a desired signal and noise. The desired signal can be an information transmission signal or a signal representative of the information transmission, such as a pilot signal. The signal strength of the desired signal can be estimated and this signal strength can be used as an estimate of the signal strength of the received signal. Signal strength is defined as the signal-to-noise ratio SNR (the energy of the desired signal divided by the energy of the noise) or the signal-to-signal-plus-noise ratio $S/N_t$ (the energy of the desired signal divided by the total received energy).

A communication system can use the signal strength measurement to perform a variety of system optimization. First, the system can efficiently allocate resource based on the signal strength measurement. For example, the system can allocate more resource to transmissions on poor quality channels in order to maintain a requisite level or performance (e.g., a predetermined bit-error-rate). Alternatively, the system can allocate less resource to transmissions on poor quality channels in order to conserve resource. It can be determined that these transmissions are inefficient use of system resource since a small amount of information is transmitted versus a large amount of expended resource. Second, the signal strength measurement can be used to adjust the transmission rate to more efficiently utilize the allocated resource. For example, the transmission rate can be increased for transmissions on high quality channels and decreased for transmissions on poor quality channels. Third, the signal strength measurement can be used to more efficiently manage the communication system. As an example, consider a communication system which supports soft handoff. Soft handoff denotes the redundant transmissions from two or more source devices to a destination device to provide space diversity which can improve performance and reliability. The system can use the signal strength measurement to efficiently add or remove source device to or from the soft handoff transmissions. Soft handoff is described in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM", issued Mar. 31, 1992, and U.S. Pat. No. 5,267,261, entitled "MOBILE STATION ASSISTED SOFT HANDOFF IN A CDMA CELLULAR COMMUNICATIONS SYSTEM", issued Nov. 30, 1993, both assigned to the assignee of the present invention and incorporated by reference herein.

In a typical communication system, the signal strength of a desired signal is computed from measurements of the energy of the desired signal and the energy of the noise. The energy of the desired signal can be determined by processing the received signal to remove the noise and computing the energy of the remaining desired signal. The energy of the noise can also be determined and computed. Alternatively, the energy of the noise can be set to a predetermined value by maintaining the amplitude of the received signal at a predetermined level through an automatic gain control (AGC) loop.

Accurate measurement of the signal strength is difficult because of a variety of factors. First, communication systems inherently operate in noisy environment. The noise increases the variation in the measurements of the energy of the desired signal and the energy of the noise. The variation in the measurements can be reduced by averaging the measurements over a longer time period. However, a tradeoff is made between the amount (or length) of averaging and the response time. Second, for mobile communication systems, the signal strength measurement is further complicated by variations in the channel characteristics due to the mobility of the communication devices. In a terrestrial environment, the transmitted signal can arrive at the destination device through one or more signal paths because of reflections and refractions from artifacts in the transmission path. The multiple copies of the received signal can add constructively or destructively at the destination device. A small displacement in the location of the destination device can result in a large change in the measured energy. This fading phenomenon can cause large variation in the signal strength measurement. And third, the signal strength measurements have a distribution density function which can be dependent on the structure of the signal and the statistic of the noise (e.g., an analog signal or a quadrature phase shift keying QPSK modulated signal) and the quality of the communication link.

For the foregoing reasons, a method and apparatus which can provide accurate estimates of the signal strength of a received signal in a communication system are much needed in the art.

SUMMARY OF THE INVENTION

The present invention is a method and apparatus for providing an accurate estimate of the signal strength of a received signal in a communication system or data transmission system. The signal strength can be measured as the signal-to-noise ratio (SNR) or the signal-to-signal-plus-noise ratio ($S/N_t$).

The received signal at a destination device comprises a desired signal and noise. The received signal can be processed to separate the desired signal from the received noisy signal. The energy of the desired signal is measured or computed. The energy of the noise can also be measured or computed. Alternatively, the energy of the noise can be approximated as the energy of the received signal. The measured signal strength of the desired signal can be computed by dividing the energy of the desired signal with the energy of the noise. In one embodiment of the present invention, the amplitude of the total received signal is controlled such that the power of the received signal is maintained approximately constant. In this embodiment, the measured signal strength of the desired signal is proportional to the energy of the desired signal.

The measured signal strength of the desired signal conforms to a distribution density function. This distribution function can be dependent on various conditions, such as the type of signal transmission and the actual signal strength of the desired signal. For the embodiment wherein the measured signal strength is proportional to the signal-to-signalplus-noise ratio (S/N$_t$), the distribution density function can be expressed as f(y|α), where y is the measured energy of the desired signal, α is the actual signal strength, and f(y|α) is a function of y for a given α. Once the measured energy y of the desired signal is computed and the distribution density function f(y|α) is determined, the signal strength of the desired signal can be estimated in one of several embodiments. The estimated signal strength of the received signal is an estimate of the signal strength of the desired signal.

In the first embodiment, the signal strength of the desired signal is estimated as the maximum likelihood estimate of the signal strength α. The maximum likelihood estimate of α can be determined by partially differentiating the distribution density function f(y|α) with respect to α, setting the partial derivative to zero, and solving for α for a given y. The resultant α corresponding to the given y, denoted as α$_o$, is the maximum likelihood estimate of α and represents an accurate estimate of the signal strength of the desired signal.

In the second embodiment, the signal strength of the desired signal is estimated based on the conditional mean of the energy of the desired signal, or E{y|α}. The conditional mean is an optimum estimate of a random parameter in the mean-square sense. In this embodiment, E{y|α} is first estimated from measurement of the energy of the desired signal. In the embodiment wherein the power of the received signal is maintained approximately constant by the gain control loop, the signal strength can be estimated as E{y|α}/c, where c is the constant dependent on the characteristics of the gain control loop, length of the integration period, and digital gain.

And in the third embodiment, the signal strength of the desired signal is estimated based on the conditional mean of E{y|α} and accounting for a predetermined bias. In this embodiment, E{y|α}/c is first computed as described above. The unbiased estimate of the signal strength is then computed as E{y|α}/c−1/N, where N is the integration period over which the energy of the desired signal and the energy of the received energy are computed.

The estimate of the signal strength of the desired signal using any one of the above described embodiments can be generalized to cover any distribution density function f(y|α). For a given α, the distribution density function f(y|α) of the signal strength can be determined mathematically, empirically based on field measurements, or through simulations. For this f(y|α), the signal strength can be estimated as the maximum likelihood estimate of α or based on the conditional mean of y in the manner described above.

The estimated signal strength of the received signal is indicative of the signal strength of the desired signal. Various transmitted signals, such as the pilot, traffic, sync, or access channel signal, can be used to estimate the signal strength of the received signal and are within the scope of the present invention. Furthermore, the present invention is applicable for any signal transmission from a source device to a destination device.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DESCRIPTION OF THE PREFERRED EMBODIMENTS

I. Estimation of the Signal Strength

In one embodiment of the present invention, the signal strength of a desired signal is estimated based on the measured signal strength of a received signal. The received signal comprises the desired signal and noise. The desired signal can be a reference signal transmitted from a source device to a destination device to assist the destination device perform a variety of system functions. The desired signal can also be an information transmission signal (e.g., a traffic channel signal). The measured signal strength of the desired signal is defined as the estimated energy of the desired signal divided by the estimated energy of the noise. In some applications, signal strength is defined as the estimated energy of the desired signal divided by the estimate of the total received energy.

Figure 1:
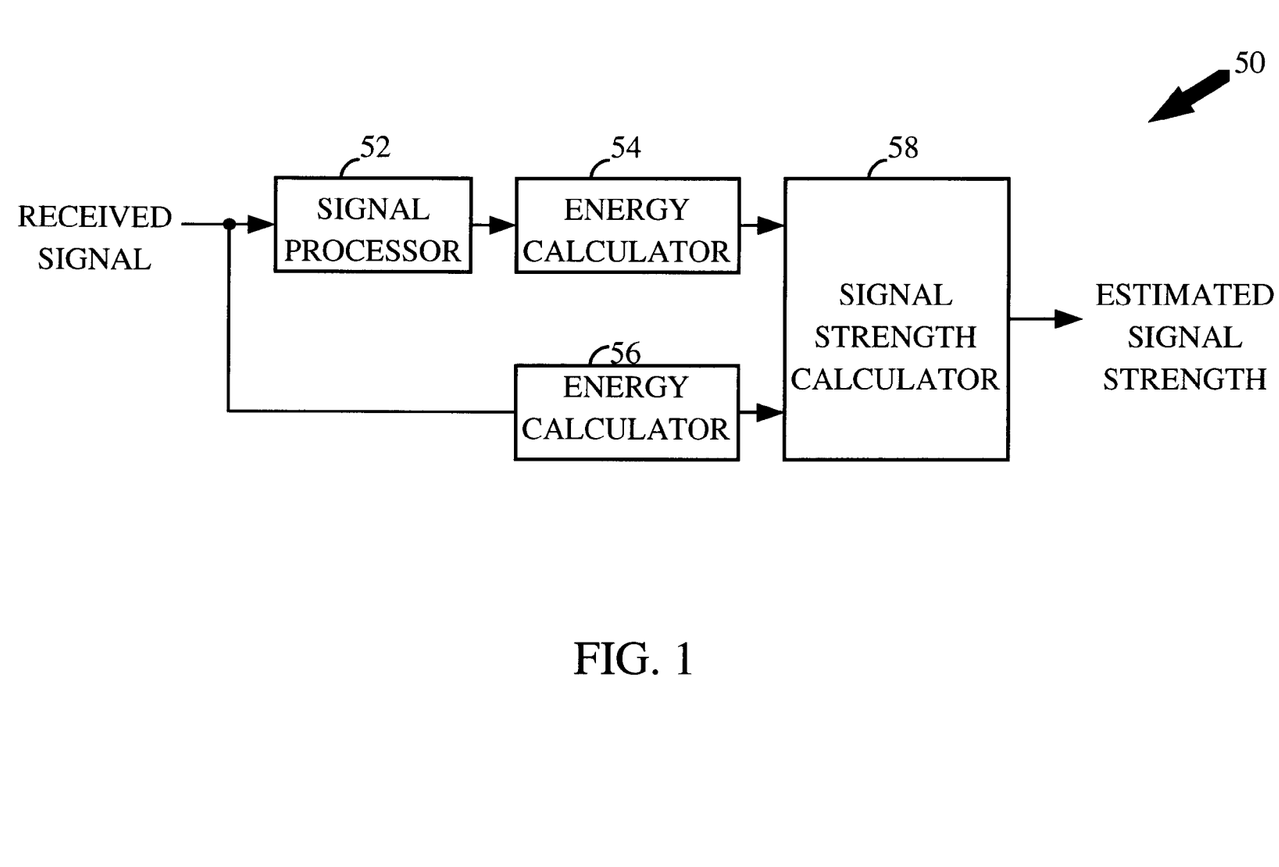
FIG. 1 is a block diagram of a signal strength estimator of the present invention.

A block diagram of a signal strength estimator 50 of one embodiment of the invention is illustrated in FIG. 1. The received signal is provided to signal processor 52 and energy calculator 56. Signal processor 52 processes the received signal to remove the noise and extract the desired signal from the received signal. Signal processor 52 can perform filtering of the received signal to obtain the desired signal. Alternatively, signal processor 52 can extract the desired signal by performing signal processing, e.g., orthogonal channel demodulation. The processing performed by signal processor 52 is dependent on the characteristics of the received signal. One signal processor 52 for a code division multiple access (CDMA) communication signal is described below. The desired signal is provided to energy calculator 54 which computes the energy of the desired signal. Similarly, energy calculator 56 computes the energy of the received signal which can be used to compute the energy of the noise. The measurements of the energy of the desired signal and the energy of the noise are provided to signal strength calculator 58. Signal strength calculator 58 can provide an estimate of the signal strength of the desired signal for each corresponding set of received signal and noise energy measurements.

Because of noise in the communication channel, the received signal comprises the desired signal and channel noise. The channel noise results in uncertainty in the energy measurements. For example, the channel noise can add constructively to the transmitted signal and results in a higher measurement of the desired signal energy. Alternatively, the channel noise can add destructively to the transmitted signal and results in a lower measurement of the desired signal energy. To provide for more reliable measurements, energy calculators 54 and 56 compute the energy of the desired signal and the received signal, respectively, over a predetermined time interval. Averaging over a longer time interval reduces the amount of variation in the energy measurements.

In one embodiment of the present invention, the amplitude of the received signal is controlled such that the power of the received signal is maintained approximately constant by an automatic gain control (AGC) loop. The AGC loop measures the power of the received signal, compares the measured power to a predetermined power threshold, and adjusts a gain element in the receiver of the destination device such that the output of the AGC loop is maintained at the power threshold. By maintaining the power of the received signal approximately constant, the measured signal strength of the desired signal is proportional to the energy of the desired signal.

Figure 7:
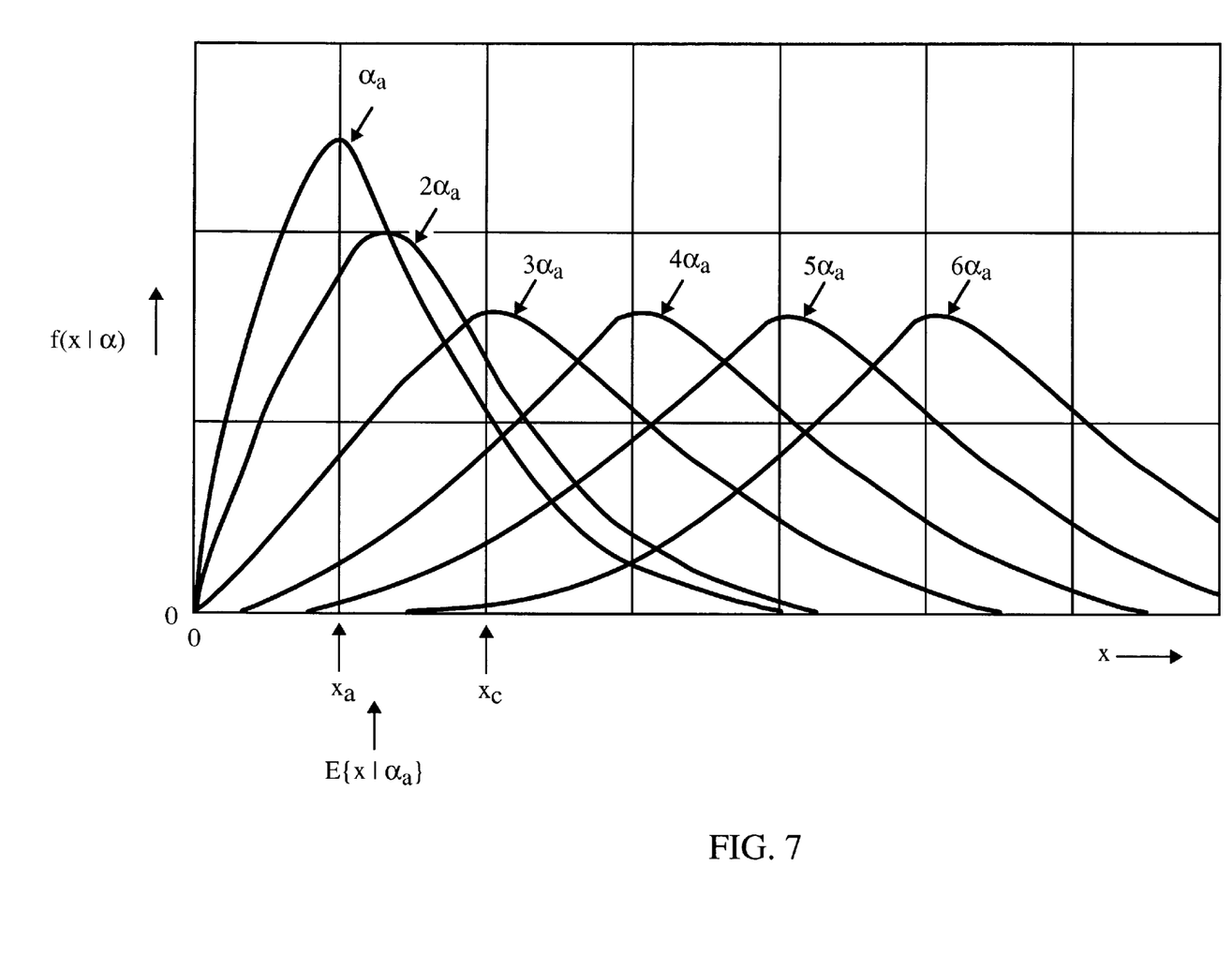
FIG. 7 is a graph of distributed density functions of the measured energy of a QPSK modulated signal for various actual signal strengths.

The measurement of the energy of the desired signal conform to a distribution density function. The shape of this distribution density function is typically dependent on the structure of the signal and the type of processing. For example, an analog modulated signal can result in energy measurements which conform to a Gaussian distribution function whereas a quadrature phase shift keying (QPSK) modulated signal can result in energy measurements which conform to a non-central Chi-square distribution function. By careful modeling of the signal component of the received signal, the shape of the distribution function can further be dependent on the quality of the communication link (or the actual signal strength of the desired signal). This is illustrated in FIG. 7 wherein the distribution density functions of the measured energy of a QPSK modulated signal for various actual signal strengths (0, $\alpha_a$, $2\alpha_a$, . . . $5\alpha_a$) are plotted. Note that the distribution functions resemble a Gaussian function at higher channel quality (e.g., $5\alpha_a$) and a non-central Chi-square function at lower channel quality (e.g., $\alpha_a$). The distribution function for a given set of conditions (e.g., a given signal transmission type and a given channel quality) can be determined through one of a numerous methods, such as through empirical measurements or through system simulation. The distribution density function $f(y|\alpha)$ is thus a function of the measured energy y of the desired signal for a given actual signal strength $\alpha$.

In the first embodiment of the present invention, the signal strength of the desired signal is estimated as the maximum likelihood estimate of the actual signal strength $\alpha$. The maximum likelihood estimate of $\alpha$ can be determined by partially differentiating the distribution density function $f(y|\alpha)$ with respect to $\alpha$, setting the partial derivative to zero, and solving for $\alpha$ for a given measured energy y of the desired signal. The resultant $\alpha$ corresponding to the given y, denoted as $\alpha_o$, is the maximum likelihood estimate of $\alpha$ and represents an accurate estimate of the signal strength of the desired signal. Describing this embodiment differently, each actual signal strength $\alpha_z$ corresponds to a distribution density function $f(y|\alpha_z)$. This distribution density function $f(y|\alpha_z)$ has a peak value at a specific y, or $y_z$. For this $y_z$, the maximum likelihood estimate of $\alpha$ corresponds to the function $f(y|\alpha_z)$ having a peak at $y_z$. There is thus a one to one correspondent between a particular $y_z$ and the maximum likelihood estimate of $\alpha$. In this first embodiment, each measured energy y is treated as a specific y corresponding to a function $f(y|\alpha_z)$ having a peak at this measured energy y. The corresponding $\alpha_z$ of this function $f(y|\alpha_z)$ is the maximum likelihood estimate of $\alpha$.

In the second embodiment, the signal strength of the desired signal is estimated based on the conditional mean of the measured energy of the desired signal, or $E\{y|\alpha\}$. In this embodiment, $E\{y|\alpha\}$ is first estimated from averaging measurements of the energy y of the desired signal. The signal strength can then be estimated as y/c, where c is a constant dependent on the characteristics of the gain control loop, length of the integration period, and digital gain.

And in the third embodiment, the signal strength of the desired signal is estimated based on the conditional mean of y and accounting for a predetermined bias. In this embodiment, y/c is first computed as described above. The unbiased estimate of the signal strength is then computed as y/c−1/N, where N is the integration period over which the energy of the desired signal and the energy of the received energy are computed.

This embodiment of the invention is especially suited to estimating the signal strength in a spread spectrum communication system. One such system is a code division multiple access communication (CDMA) system wherein the signal strength measurement is used to allocate resources and to control the handoff of a subscriber station between multiple base stations.

Determining the strength of a received signal is also useful in ranging systems. One such ranging system is the Global Positioning System (GPS). In these ranging systems, an estimate of the signal strength is used to optimally adjust the parameters of both the acquisition and tracking signal processing routines. The search (or dwell) times can be varied from a fraction of micro-second for strong signals to tens of micro-seconds for weak signals. In order to minimize the search time, the searching routine can use the information of the estimated signal strength to adjust the search time accordingly.

The present invention may be used in any communication system having a receiver which comprises a pair of correlators having a common input and providing an in-phase and quadrature components at the respective outputs.

Figure 2:
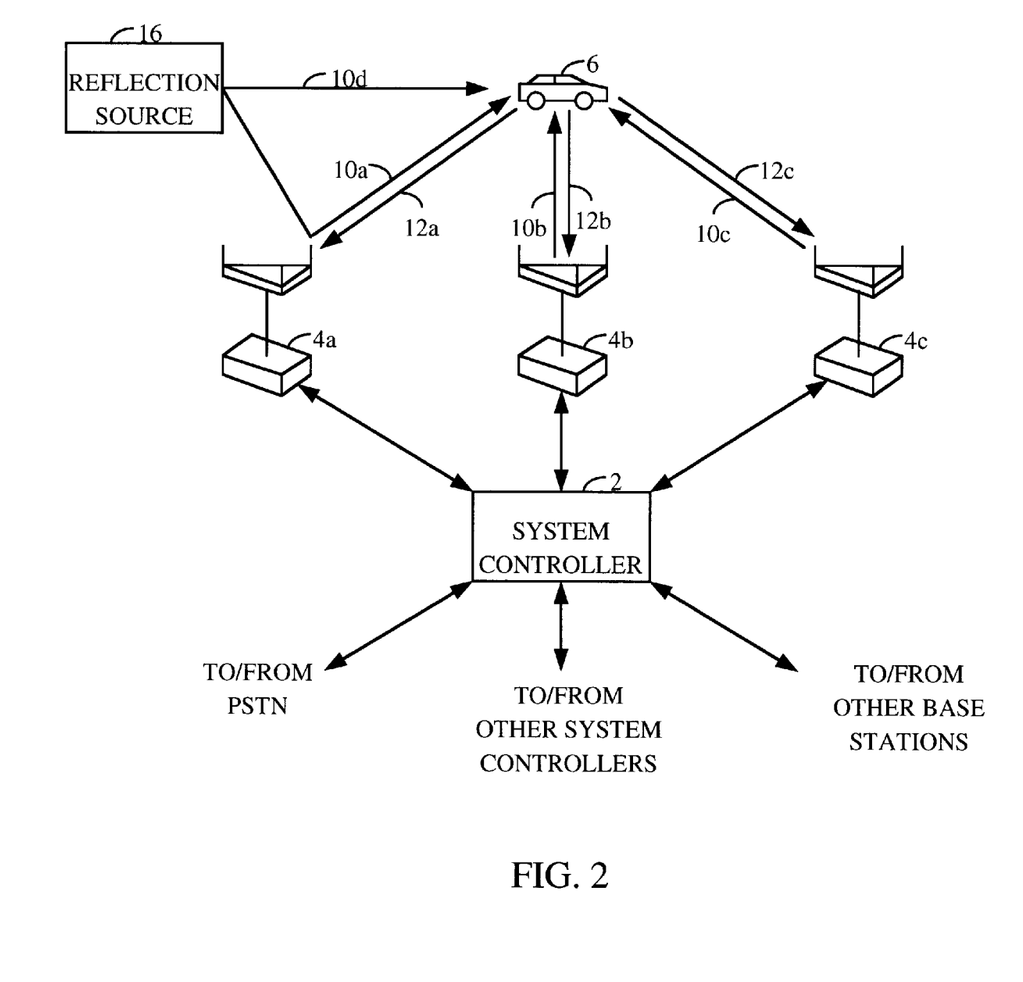
FIG. 2 is a diagram of a communication system comprising a plurality of base stations in communication with a subscriber station.

II. Application of the Present Embodiment of the Invention to a CDMA Communication System The description of the estimate of the signal strength of the received signal of the present embodiment of the invention can be further clarified through an implementation in a CDMA communication system. FIG. 2 represents a communication system in accordance with the present embodiment of the invention. The system comprises multiple base stations 4 in communication with multiple subscriber stations 6 (only one subscriber station 6 is shown for simplicity). System controller 2 is connected to: (1) all base stations 4 in the communication system, (2) the public switched telephone network (PSTN), and (3) system controllers of other communication systems. System controller 2 coordinates the communication between users connected to the PSTN, other systems, or subscriber stations 6. Communications from base stations 4 to subscriber station 6 occur on the forward link through signal paths 10 and communications from subscriber station 6 to base station 4 occurs on the reverse link through signal paths 12. The signal path can be a straight path, such as signal path 10a, or a reflected path, such as signal path 10d. Reflected path 10d is created when the signal transmitted from base station 4a is reflected off reflection source 16 and arrives at subscriber station 6 through a different path than the straight path. Although illustrated as a block in FIG. 2, reflection source 16 is an artifact in the environment in which subscriber station 6 is operating, e.g., a building or other structure.

Figure 3:
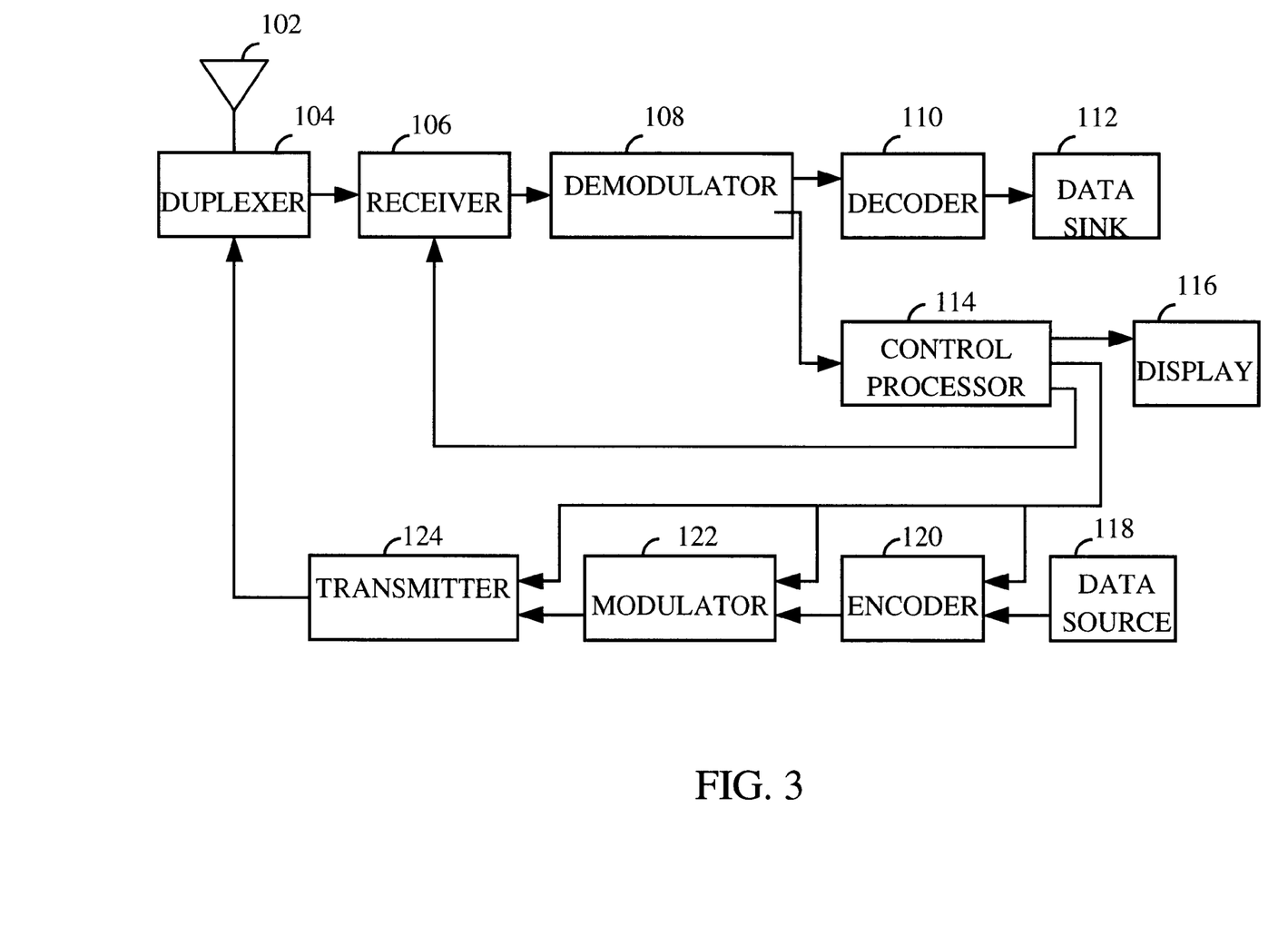
FIG. 3 is a block diagram of the signal processing within a subscriber station.

A simplified block diagram of the signal processing within a subscriber station is shown in FIG. 3. The signal processing within a base station is similar to that shown in FIG. 3, with the distinction that the implementation of the individual blocks can be different for the base station for reasons well understood by those skilled in the art. The base station receives various streams of data (e.g., voice data streams, paging messages, and pilot data stream), encodes each stream using a respective encoding format, modulates each encoded data stream using a respective modulation format, and combines the modulated data to provide a spread signal. The spread signal is filtered, upconverted, amplified, and transmitted on the forward link.

In accordance with one embodiment of the present invention, the forward link signal processing is performed as described in detail in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING SIGNAL WAVEFORMS IN A CDMA CELLULAR TELEPHONE SYSTEM", both assigned to the assignee of the present invention and incorporated by reference herein. The present embodiment of the invention can also be applied to other communication systems, such as the system described in U.S. patent application Ser. No. 08/963,386, entitled "METHOD AND APPARATUS FOR HIGH RATE PACKET DATA TRANSMISSION", filed Nov. 3, 1997, assigned to the assignee of the present invention and incorporated by reference herein. The modulator 122 is described in greater detail below.

Figure 4:
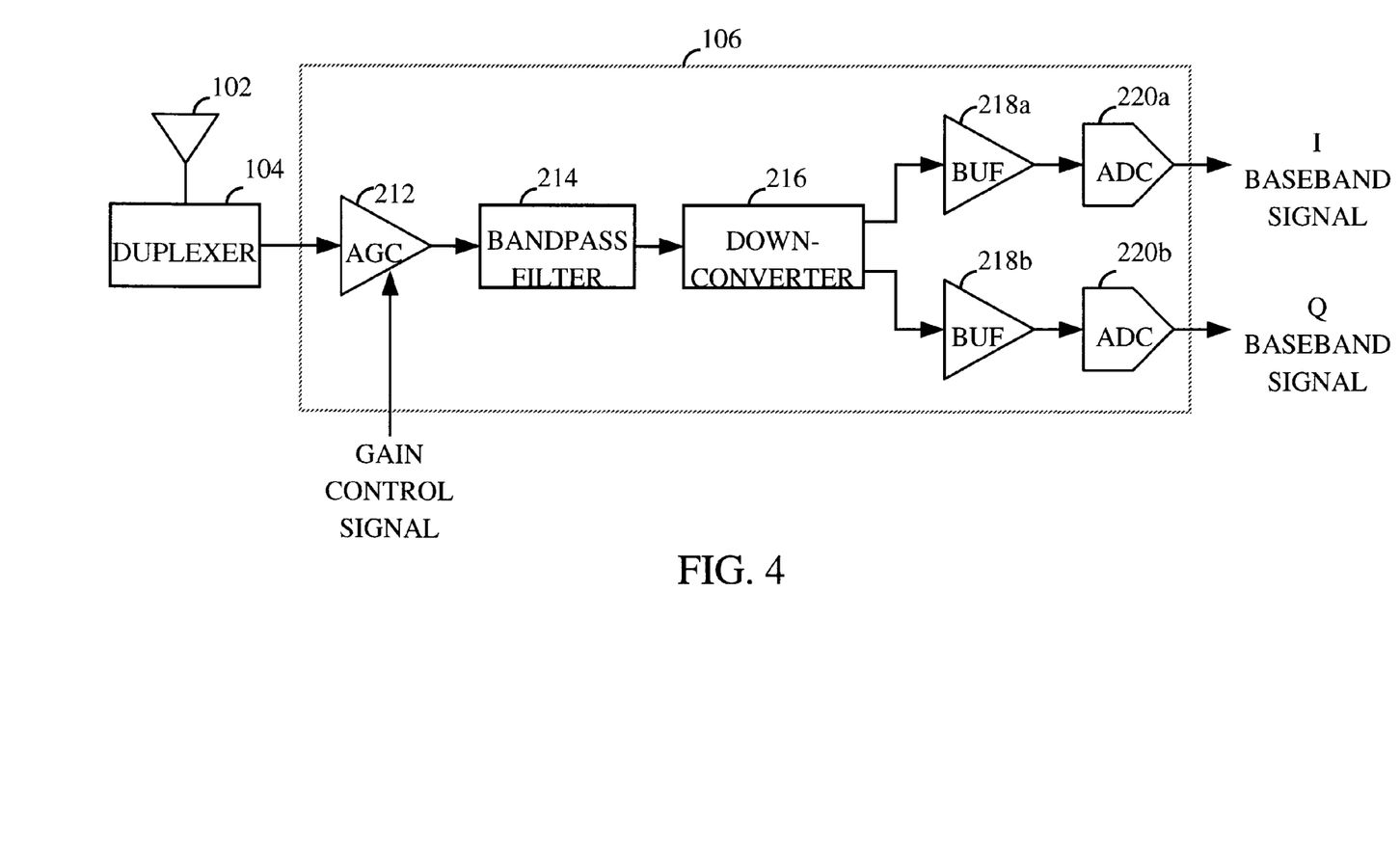
FIG. 4 is a simplified block diagram of a receiver.

Referring to FIG. 4, at the subscriber station, the forward link signal is received by antenna 102, routed through duplexer 104, and provided to receiver 106. Within receiver 106, the received forward link signal is provided to automatic gain control (AGC) amplifier 212 which amplifies the received signal such that the amplitude of the quantized baseband signals from analog-to-digital converters (ADCs) 220 are maintained approximately constant regardless of the power level of the received signal. The gain controlled signal from amplifier 212 is provided to bandpass filter 214 which filters the out-of-band noise. In one embodiment, bandpass filter 214 is a surface acoustic wave (SAW) filter having a bandwidth corresponding to that of the received signal. The filtered signal from bandpass filter 214 is provided to downconverter 216 which translates the received signal from an RF frequency down to approximately baseband. In one embodiment, downconverter 216 is a quadrature downconverter which downconverts the filtered signal with an inphase and a quadrature sinusoid to provide an inphase and a quadrature signal, respectively. Downcoverter 216 can comprise a single downconversion stage (direct downconversion) or multiple conversion stages. The inphase and quadrature signals from downconverter 216 are provided to buffers (BUF) 218a and 218b, respectively, which can provide gain and/or buffering. The buffered signals from buffers 218a and 218b are provided to ADCs 220a and 220b which sample the signals to provide the I and Q baseband signals, respectively. The receiver shown in FIG. 4 is a simplified block diagram showing some of the basic signal processing functions. In other embodiments of the present invention, other receivers that perform the functions described herein can alternatively be used.

Figure 5:
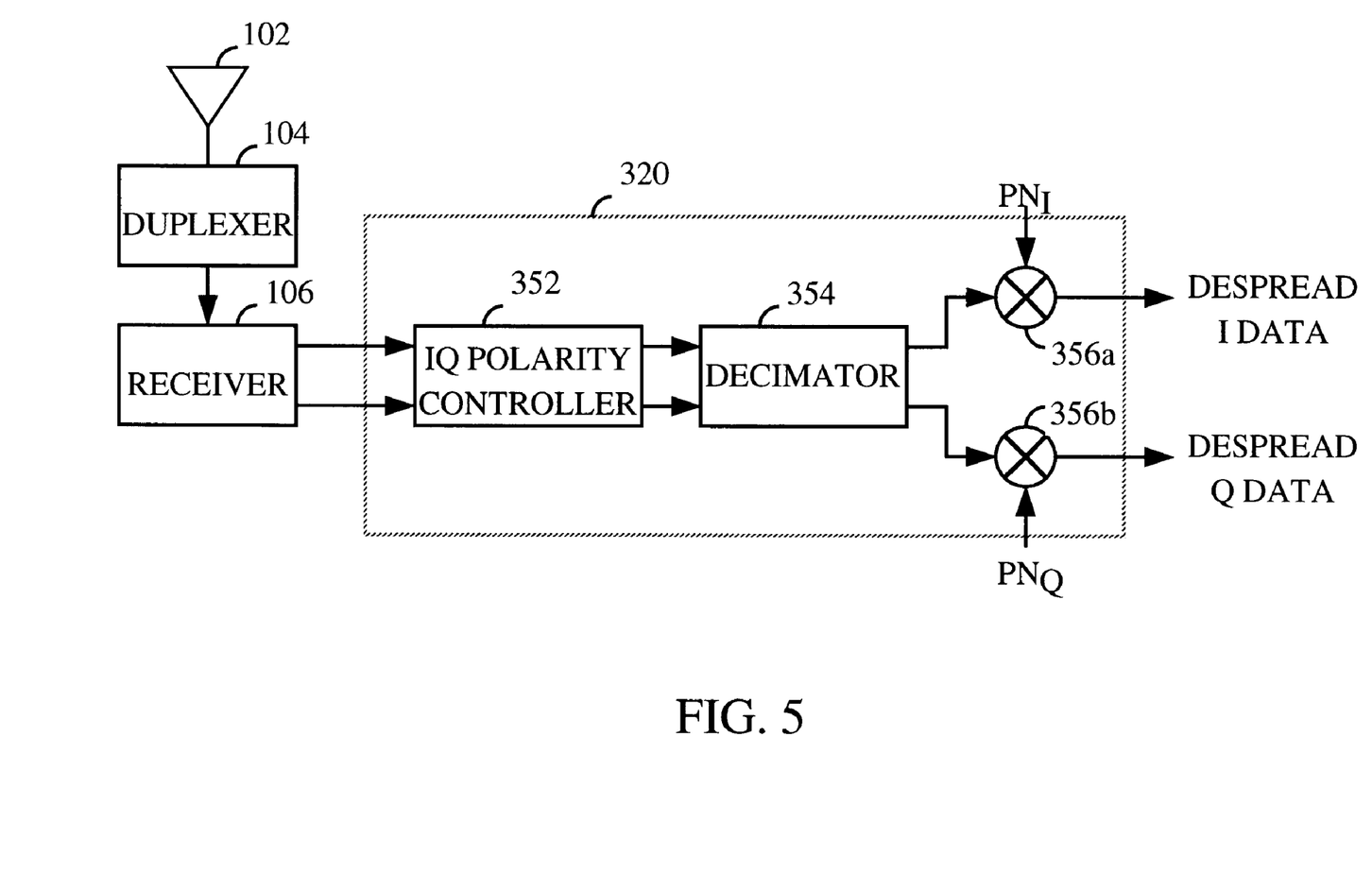
FIG. 5 is a block diagram of a short PN despreader.

A block diagram of short PN despreader 320 is shown in FIG. 5. The I and Q baseband signals are provided to IQ polarity controller 352 which can swap and/or invert one, or both, of the signals to account for the phase error in the downconversion sinusoids within downconverter 216 (see FIG. 4). The phase corrected signals from IQ polarity controller 352 are provided to decimator 354 which can provide filtering and/or decimation of the signals. In one embodiment, the decimated signals from decimator 354 have a sample rate of one sample per chip. As an example, if the received signal is sampled at a rate of eight samples per chip, decimator 354 decimates the signal by a factor of eight to one. The decimated signals from decimator 354 are provided to multipliers 356a and 356b which despread the signals with the short PNI and PNQ sequences, respectively. The short PN despreading is the inverse of the spreading performed by the short PN spreader within the corresponding modulator at the base station. The outputs of multipliers 356a and 356b comprise the despread I and Q data.

Referring to FIG. 3, in one embodiment, control processor 114 connects to receiver 106, demodulator 108, and display 116. Control processor 114 receives the data from demodulator 108 and estimates the signal strength of the received signal. The estimated signal strength can be provided to display 116 which can display the information in various forms. The estimated signal strength can also be provided to encoder 120, modulator 122 or transmitter 124 for transmission back to the base stations. The information can be used to assist the base stations to perform handoffs and/or other system functionalities. Control processor 114 can also provide the gain control signal to receiver 106 to adjust the amplitude of the quantized baseband signals from ADCs 220 such that the total power of the received signal is maintained approximately constant regardless of the power level of the received signal. Control processor 114 can be implemented as a microcontroller, a microprocessor, a digital signal processing (DSP) chip, or an application specific integrated circuit (ASIC) programmed to perform the functions as described herein.

The hardware as described above is one of many embodiments which can be used by a subscriber station to receive and demodulate transmissions from multiple base stations. Other hardware architectures can also be designed to perform the functions described herein. These various architectures are within the scope of the present invention.

III. Estimates of the Signal Strength Received Signal

Figure 6:
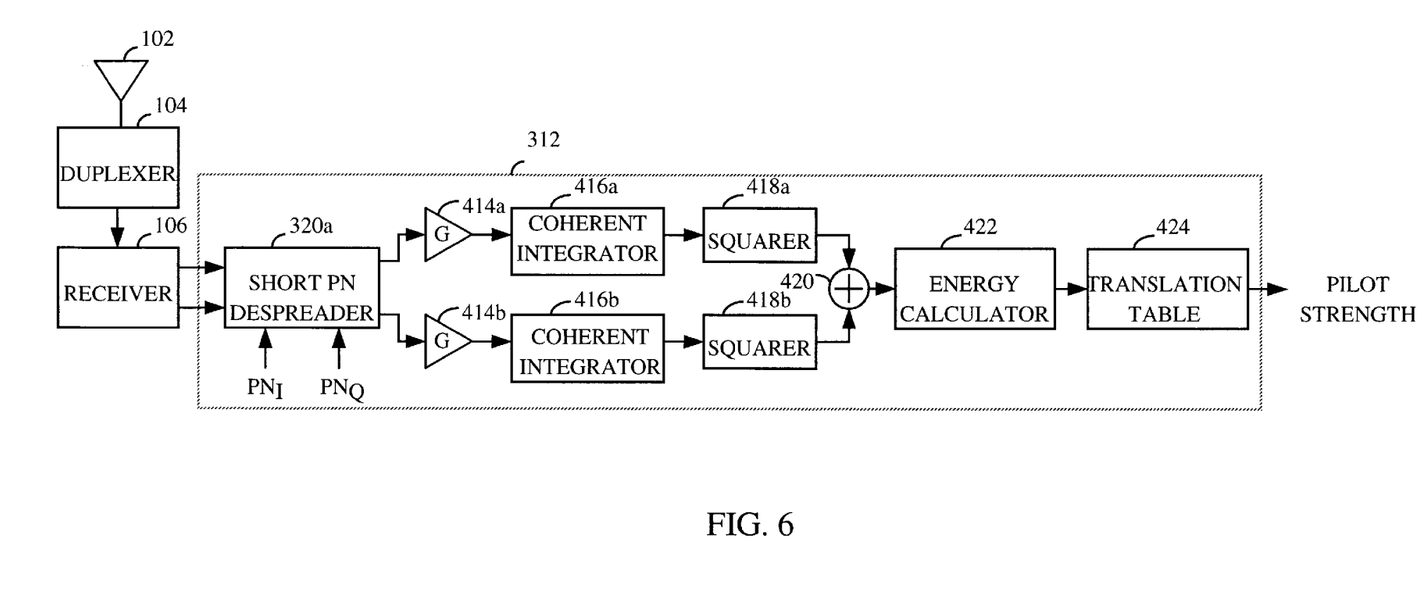
FIG. 6 is a block diagram of a searcher within the demodulator.

The transmission from a single base station can be received through one or more signal paths. Furthermore, while in soft handoff, the subscriber station can receive transmissions from two or more base stations. Referring to FIG. 6, searcher 312 within the subscriber station searches the received signal for strong signal paths which exceed a predetermined searcher threshold and which have not been assigned to a correlator. In one embodiment, the strong signal paths are determined based on the estimated pilot strength. Thus, most of the time, the correlators are assigned to strong signal paths.

A block diagram of searcher 312 is shown in FIG. 6. The digitized I and Q baseband signals from receiver 106 are provided to short PN spreader 320a within searcher 312. Short PN despreader 320a despreads the I and Q signals with the short PN sequences having an offset matching that of the particular signal path which is being searched. The short PN despreading is the inverse of the spreading performed by the short PN spreader within the corresponding modulator at the base station. The output of short PN spreader 320a comprises the despread I and Q signals which are provided to gain elements (G) 414a and 414b, respectively. Gain elements 414a and 414b scale the respective despread signals with a scaling factor of G and provide the scaled signals to coherent integrators 416a and 416b, respectively. Within coherent integrator 416, the rotating phase error of the scaled and despread I and Q signals being integrated (to produce the received pilot signal) is removed by performing a dot product of the PNI and PNQ signals with a recovered pilot signal.

Next, the phase corrected I and Q signals are each integrated over N chips to provide the received pilot signal. The integration decovers the pilot signal (which is covered with Walsh code 0 in one embodiment) and removes the signals from the non-pilot code channels. In one embodiment, N corresponds to an integer number of Walsh symbols (e.g., N=512 for 8 Walsh symbols in IS-95 systems). Coherent integrators 416 can also provide scaling by a factor of k. For example, if the inputs to coherent integrators 416 comprise 13 bits and the outputs from coherent integrators 416 comprise the eight most significant bits, then the operation is equivalent to dividing by 32.

The I and Q pilot signals are provided to squarers 418a and 418b, respectively, which square the input signals. The squared outputs from squarers 418 are provided to summer 420 which sums the signals to provide an energy measurement. The measurement is provided to energy calculator 422 which, in one embodiment, calculates the energy of the pilot signal over M measurements as:

$$y = \sum_{j=1}^{M} \left[ \left(\sum_{i=1}^{N} I_i\right)^2 + \left(\sum_{i=1}^{N} Q_i\right)^2 \right]. \quad (1)$$

The objective is to estimate the strength of the desired signal using one or several observations, $y_j$, j=1,2, ..., p. Each one of these observations represents a random variable. In some cases reasonable estimators can be found on the basis of intuition, but various general methods have been developed for deriving more efficient estimators. The present invention preferably uses a method that quite often leads to estimators possessing desirable properties. The idea is to use, as an estimate of the signal strength, a value that corresponds to the largest "likelihood" for the observed data. The joint density function of p random variables, $y_1, y_2, \ldots, y_p$, say $f(y_1, y_2, \ldots, y_p|\alpha)$ is referred to as a likelihood function. For a fixed $y_1, y_2, \ldots, y_p$, the likelihood function is a function of $\alpha$ and is often denoted $L(\alpha)$. The maximum likelihood principle of estimation is to choose as the estimate of $\alpha$, for a given set of observations, that value for which the observed set of data would have been most likely to occur. That is, if the likelihood of observing a given set of observations is much higher when $\alpha=\alpha_1$ than when $\alpha=\alpha_2$, then it is reasonable to choose $\alpha_1$ as an estimate of a rather than $\alpha_2$. In general, if $L(\alpha)$ is differentiable and assumes a maximum on the space of all possible a, then the maximum likelihood estimate will be the solution of the equation $$\frac{d}{d\alpha} L(\alpha) = 0 \quad (2)$$

If one or more solutions to the above equation exist, it should be verified which ones, if any maximize $L(\alpha)$. Note also that any value of a that maximizes L(a) will also maximize the log-likelihood, ln L(a), so for computional convenience an alternate form of the maximum likelihood equation is $$\frac{d}{d\alpha} \ln L(\alpha) = 0 \quad (3)$$

In one embodiment, the signal strength of the received signal is estimated by the signal strength of the received pilot signal, or the pilot strength. The pilot strength is defined as the ratio of the pilot energy per chip with respect to the total interference density, $E_c/N_t$. Hereinafter, the pilot strength is denoted as "$\alpha$". For a given $\alpha$, the I and Q pilot signals are independent random variables. The amount of energy that is likely to be measured for each at any one time differs over a range of values, as shown in FIG. 7. In the absence of the desired signal, the energy distribution of across the range of possible values typically conforms to a Gaussian distribution.

In the presence of signal, the conditional probability density function of y is a random variable having a non-central Chi-square distribution function, hereinafter referred to as $f(y|\alpha)$, which is defined as:

$$f(y|\alpha) = \frac{1}{2\sigma^2}\left(\frac{y}{M\mu^2}\right)^{\frac{M-1}{2}} \exp\left(\frac{M\mu^2+y}{2\sigma^2}\right) I_{M-1}\left(\frac{\mu\sqrt{My}}{\sigma^2}\right), \quad (4)$$

where:
$y \geq 0$;
$f(y|\alpha)$=the distribution density function of the measured pilot energy y for a given value of $\alpha$, $\mu$ being a function of a as defined below;
$I_{M-1}()$=the (M−1)-th order modified Bessel function of the first kind; and $$\mu^2 = \mu_I^2 + \mu_Q^2 = c\alpha, \quad (5)$$

where
$\mu_I$=the expected value of the I component of the pilot signal,
$\mu_Q$=the expected value of the Q component of the pilot signal, and
c=t is a constant dependent on the characteristics of the gain control loop, length of the integration period, and digital gain, such that:

$$c = 2\sigma_n^2 N^2 \frac{G^2}{k^2}, \quad (6)$$

where
N=the number of chips coherently integrated, or the duration of the coherent integration period,
G=the signal processing gain of gain elements 414, and
k=the scaling factor of coherent integrators 416.

Typically, the amplitude of the received signal is controlled by an automatic gain control (AGC) circuit, such that the total power of the received signal at the output of the AGC circuit is maintained approximately constant regardless of the power level of the received signal before conditioning by the AGC circuit. This gain control loop effectively sets the total power level Nt, to a known value of $Nt=2\sigma_n^2$. Scaling factors (N, G, and k) are included in the calculation of c in equation (6) to take into account the number of measurements (N) taken during the period (p), the gain (G) of the signal processing by gain elements 414, and the scaling (k) performed by coherent integrator 416.

It can be seen from equation (4) that for M=1, there is a family of distribution curves, each curve having a different shape depending on the value of $\alpha$. Plots showing $f(y|\alpha)$ for six different values of $\alpha$ are shown in FIG. 7. For high values of $\alpha$ (e.g., $\alpha_6=6\alpha_a$) $f(y|\alpha_6)$ resembles a Gaussian distribution. Conversely, for low value of $\alpha$ (e.g., $\alpha_a$), $f(y|\alpha_a)$ is more distorted, or resembling a Rician probability distribution function.

In the first embodiment, the estimate of $\alpha$ is based on the maximum likelihood estimate of $\alpha$. The maximum likelihood estimate of $\alpha$ is an efficient estimate which has the minimum possible variance and which satisfies the Cramer-Rao bound with equality. The maximum likelihood estimate of $\alpha$ can be determined by partially differentiating $L(\alpha)$ with respect to $\alpha$, setting the partial derivative to zero, and solving for $\alpha$ for a given y. The resultant $\alpha$ is then the maximum likelihood estimate of $\alpha$, or $\alpha_o$. Since $y_1$, $y_2, \ldots, y_p$ represents a random sample from the distribution with $f(y|\alpha)$, then $$L(\alpha) = \prod_{j=1}^{p} f(y_j | \alpha) \qquad (7)$$

Applying the differentiation shown in equation (3) to the likelihood function $L(\alpha)$ shown by equation (7), setting the derivative to zero, and solving for $\alpha$ to obtain the maximum likelihood estimate of $\alpha$, or $\alpha_o$, the following is derived:

$$\sum_{j=1}^{p} \frac{\lambda_j}{2\alpha}\left(I_M(\lambda_j) + \frac{M-1}{\lambda_j} I_{M-1}(\lambda_j)\right) - \left(\frac{M-1}{2\alpha} + \frac{Mc}{2\sigma^2}\right) I_{M-1}(\lambda_j) = 0$$

where, $$\lambda_j = \frac{\sqrt{Mc\alpha y_j}}{\sigma^2}; \text{ and} \qquad (8)$$

$I_{M-2}(\ )$, $I_{M-1}(\ )$, and $I_M(\ )$ are the (M−2)-th, (M−1)-th, and (M)-th order modified Bessel functions of the first kind, respectively;

For the case of M=1, the energy of the pilot signal in equation (1) can be simplified as $x=I^2+Q^2$. The probability density function of x, hereinafter referred to as $f(x|\alpha)$, can be defined as:

$$f(x|\alpha) = \frac{1}{2\sigma^2} \exp\left(\frac{\mu^2+x}{2\sigma^2}\right) I_0\left(\frac{\mu\sqrt{x}}{\sigma^2}\right), \qquad (9)$$

where:
  $x \geq 0$;
  $f(x|\alpha)$=the distribution density function of the measured pilot energy x for a given value of $\alpha$, $\mu$ being a function of $\alpha$ as defined above; and
  $I_o(\ )$=the zero-th order modified Bessel function of the first kind.

From equation (9) for M=1, the maximum likelihood estimate of $\alpha$, for multiple observation reduces to:

$$\alpha = \frac{\sigma^2}{pc} \sum_{j=1}^{p} \theta_j \frac{I_1(\theta_j)}{I_0(\theta_j)} \qquad (10)$$

where, $$\theta_j = \frac{\sqrt{c\alpha x_j}}{\sigma^2}$$

The maximum likelihood estimate of $\alpha$ satisfies equation (10). Since equation (10) is not given explicitly in closed form, the maximum likelihood estimate of $\alpha$, can be solved numerically using one of any number of techniques known in the art. The numerical computation can be performed by microcode on a microprocessor, a microcontroller, or other computational devices which are known and used in the art.

Using equation (10), a translation table can be computed for various values of x. Referring to FIG. 6, this translation table can be loaded into a read only memory, a random access memory, or other storage devices which is shown as translation table 424. During normal operation, the maximum likelihood estimate of $\alpha$ can be addressed once the measured pilot energy x is computed.

A translation table listing the maximum likelihood estimate of $\alpha$ for various values of x is shown in Table 1. Table 1 is generated given the following set of parameters: $2\sigma_n^2$=18, N=512, G=2, k=32, p=1, and M=1. Note that the values of the measured pilot energy x in Table 1 are in linear term whereas the maximum likelihood estimates of $\alpha$ are given in decibel (dB). Similar tables can be generated for different system parameters and are within the scope of the present invention.

TABLE 1

Energy translation to Ec/Nt for N = 512, G = 2, k = 32, M = 1, and p = 1

| Energy | Ec/Nt |
|---|---|
| 18468 | 0 |
| 16464 | −0.5 |
| 14677 | −1 |
| 13085 | −1.5 |
| 11780 | −2 |
| 10383 | −2.5 |
| 9256 | −3 |
| 8251 | −3.5 |
| 7356 | −4 |
| 6558 | −4.5 |
| 5847 | −5 |
| 5213 | −5.5 |
| 4648 | −6 |
| 4144 | −6.5 |
| 3696 | −7 |
| 3296 | −7.5 |
| 2939 | −8 |
| 2622 | −8.5 |
| 2339 | −9 |
| 2086 | −9.5 |
| 1861 | −10 |
| 1661 | −10.5 |
| 1482 | −11 |
| 1323 | −11.5 |
| 1181 | −12 |
| 1055 | −12.5 |
| 942 | −13 |
| 842 | −13.5 |
| 752 | −14 |
| 672 | −14.5 |
| 601 | −15 |
| 538 | −15.5 |
| 481 | −16 |
| 431 | −16.5 |
| 386 | −17 |
| 346 | −17.5 |
| 311 | −18 |
| 279 | −18.5 |
| 251 | −19 |
| 226 | −19.5 |
| 203 | −20 |
| 183 | −20.5 |
| 166 | −21 |
| 150 | −21.5 |
| 136 | −22 |
| 123 | −22.5 |
| 112 | −23 |
| 103 | −23.5 |
| 94 | −24 |
| 86 | −24.5 |
| 80 | −25 |
| 74 | −25.5 |
| 69 | −26 |
| 65 | −26.5 |
| 61 | −27 |
| 57 | −27.5 |
| 55 | −28 |

TABLE 1-continued

Energy translation to Ec/Nt for N = 512, G = 2, k = 32, M = 1, and p = 1

| Energy | Ec/Nt |
|--------|-------|
| 52 | −28.5 |
| 50 | −29 |
| 48 | −29.5 |
| 47 | −30 |
| 46 | −30.5 |
| 44 | −31 |
| 43 | −31.5 |

Figure 8:
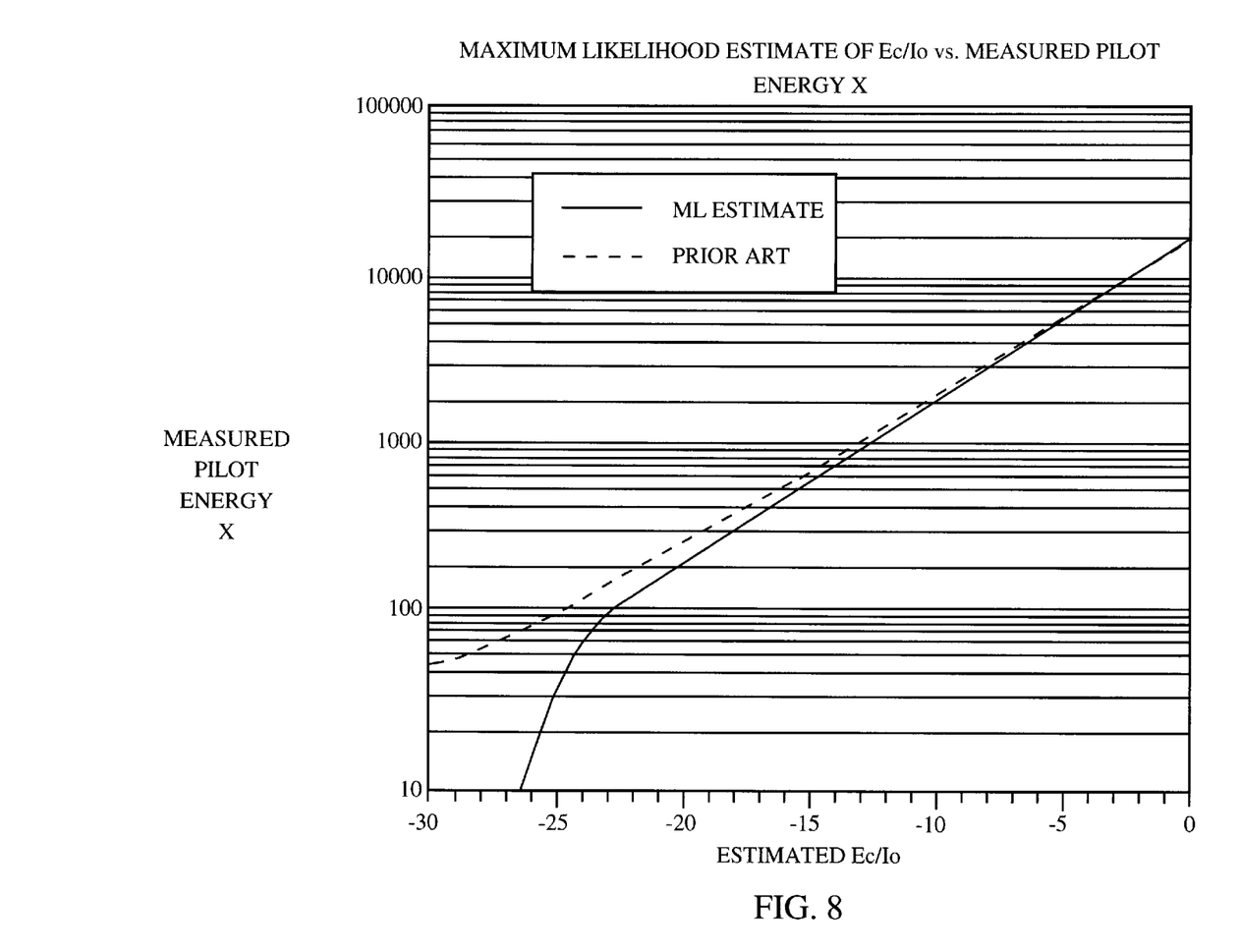
FIG. 8 are plots of the estimated pilot strength α, or E$_c$/I$_o$, versus the measured pilot energy x for the maximum likelihood estimate of α and for the prior art estimate of α.

The maximum likelihood estimate of α versus the measured pilot energy x is also plotted in FIG. 8, which is shown by the solid line. Also plotted in FIG. 8 is a prior art estimate of x versus the measured pilot energy x, which is shown by the dashed line. It can be noted that the two graphs are substantially similar for high values of x (e.g., x values corresponding to α between −10 and 0 dB). At low values of x, the difference between the two plots is substantial. For example, at x=72 the maximum likelihood estimate of α is −23.0 dB and the prior art estimate of α is −27.0 dB, resulting in a difference of 4.0 dB. This difference is substantial and can noticeably degrade the performance of the communication system.

In the second and third embodiments, the conditional mean or the average value of the received signal is used to estimate the signal strength of the received signal. From equation (1), the expected value $E\{y|\alpha\}$ of y for a given α can be computed as:

$$E\{x|\alpha\} = E\{I^2 + Q^2\} = \mu_I^2 + \mu_Q^2 + 2\sigma^2 = c\alpha + \frac{c}{N} \quad (11)$$

Rearranging the terms in equation (11) yields the following:

$$\frac{E\{x|\alpha\}}{c} = \alpha + \frac{1}{N} \quad (12)$$

If p samples are used to estimate the average received energy, then (12) can be written as $$\frac{1}{p}\sum_{j=1}^{p} xj = a + \frac{1}{N} \quad (13)$$

At the subscriber station, the expected value of x can be estimated by the measured pilot energy x and the constant c. In one embodiment, c is known since the total power of the received signal is maintained approximately constant by the gain control loop. Therefore, the ratio x/c can be used as an estimate of the pilot strength α. However, note that x/c results in a biased estimate of α. The unbiased estimate of α can be obtained by subtracting the term 1/N from x/c.

Although the unbiased estimate of α is a better estimate of α, the unbiased estimate can still be a suboptimal estimate of α for a particular trial (or measurement). For example, the unbiased estimate can be suboptimal for a distribution density function f(y|α) having a large variance, since the unbiased estimate of α would also have a large variance.

For low values of α, estimating the Ec/Nt of the received pilot signal based on the expected value of y, or $E\{x|\alpha\}$, can result in a suboptimal estimate which can degrade the performance of the communication system. In particular, estimating α based on $E\{x|\alpha\}$ can result in a slightly high estimate of α which can result in suboptimal use of system resources. For example, if the actual pilot strength is −14 dB but the estimated pilot strength is −12 dB, the base station corresponding to this pilot may be added to the soft handoff of the subscriber station when it should not be added, thereby resulting in a higher usage of the system resource unnecessarily.

Referring to FIG. 6, searcher 312 comprises gain elements 414, coherent integrators 416, squarers 418, summer 420, energy calculator 422, and translation table 424. One or more of these functions can be located within control processor 114 to minimize the required hardware. For example, it may be more efficient to incorporate energy calculator 422 and translation table 424 into control processor 114 for a particular system design. Furthermore, translation table 424 can be eliminated by performing the calculation of either equation (8), (10), or (12) as necessary. These various implementations of searcher 312 and control processor 114 can be contemplated and are within the scope of the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for providing an estimate of a received signal strength, the method comprising:
   receiving a signal, the received signal comprising a desired signal;
   measuring an energy of the desired signal to provide a measured energy, the measuring further comprising first integrating the desired signal over a first predetermined interval to provide an averaged energy, and second integrating the averaged energy over a second predetermined interval to provide the measured energy; and
   estimating a signal strength of the desired signal in accordance with the measured energy, wherein the estimated signal strength is indicative of the received signal strength.

2. The method of claim 1 wherein the second integrating is performed non-coherently.

3. A method for providing an estimate of a received signal strength, the method comprising:
   receiving a signal, the received signal comprising a desired signal;
   measuring an energy of the desired signal to provide a measured energy; and
   estimating a signal strength of the desired signal in accordance with the measured energy, wherein the estimated signal strength is indicative of the received signal strength, and wherein the estimating comprises computing a maximum likelihood estimate of an actual signal strength based on the measured energy, and wherein the signal strength is based on the maximum likelihood estimate.

4. The method of claim 3 wherein the computing is performed with a translation up table.

5. A signal strength estimator for providing an estimate of a signal strength of a received signal in a communication system, comprising:

a receiver for providing a received signal, the received signal comprising a desired signal;

a signal processor connected to the receiver for receiving the received signal and providing the desired signal;

an energy calculator connected to the signal processor for receiving the desired signal and providing the measured energy, the energy calculator comprising a first integrator for receiving the desired signal and integrating the desired signal over a first predetermined interval to provide an averaged energy, and a second integrator connected to the first integrator for receiving the averaged energy and integrating over a second predetermined interval to provide a measured energy; and a signal strength estimator connected to the energy calculator for receiving the measured energy and providing an estimate of a signal strength of the desired signal based on the measured energy, wherein the signal strength is indicative of the signal strength of the received signal.

6. The signal strength estimator of claim 5 wherein the second integrator is a non-coherent integrator.

7. A signal strength estimator for providing an estimate of a signal strength of a received signal in a communication system, comprising:

a receiver for providing a received signal, the received signal comprising a desired signal;

a signal processor connected to the receiver for receiving the received signal and providing the desired signal;

an energy calculator connected to the signal processor for receiving the desired signal and providing the measured energy; and a signal strength estimator connected to the energy calculator for receiving the measured energy and providing an estimate of a signal strength of the desired signal based on the measured energy, wherein the signal strength is indicative of the signal strength of the received signal, the signal strength estimator comprising means for computing a maximum likelihood estimate of an actual signal strength based on the measured energy, wherein the signal strength is based on the maximum likelihood estimate.

8. The signal strength estimator of claim 7 wherein the means for computing is a translation up table.

9. In a communication system capable of providing transmissions from at least one base station to at least one subscriber station, a method for measuring link signal strength, the method comprising:

transmitting a desired signal from at least one base station to a subscriber station;

receiving the desired signal at the subscriber station to provide a measured energy; and estimating a signal strength of the received desired signal based on the measured energy, the estimating comprising computing a maximum likelihood estimate of an actual signal strength based on the measured energy, wherein the signal strength is based on the maximum likelihood estimate.

10. The method of claim 9 wherein the computing is performed with a translation up table.

11. In a communication system capable of providing soft handoff transmissions from at least one base station to at least one subscriber station, a method for selecting the soft handoff transmissions, the method comprising:

transmitting a desired signal from at least one base station to a subscriber station;

first receiving the desired signal at the subscriber station to provide a measured energy;

estimating a signal strength of the received desired signal based on the measured energy, the estimating comprising computing a maximum likelihood estimate of an actual signal strength based on the measured energy, wherein the signal strength is based on the maximum likelihood estimate;

sending the estimated signal strength of the received signal to the at least one base station; and second receiving the estimated signal strength of the received signal, wherein the soft handoff transmissions are selected based on the received estimated signal strength.

* * * * *